US009872237B1

(12) United States Patent
Wang et al.

(10) Patent No.: US 9,872,237 B1
(45) Date of Patent: Jan. 16, 2018

(54) RESPONSE MECHANISM FOR DETECTION OF A FAKED BASE STATION

(71) Applicant: Futurewei Technologies, Inc., Plano, TX (US)

(72) Inventors: Zhibi Wang, Woodridge, IL (US); Baoling Sheen, Kildeer, IL (US); Marcus Wong, Greenbrook, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/224,842

(22) Filed: Aug. 1, 2016

(51) Int. Cl.
*H04M 1/725* (2006.01)
*H04W 48/16* (2009.01)
*H04B 17/23* (2015.01)
*H04W 4/14* (2009.01)
*H04M 3/42* (2006.01)
*H04W 48/06* (2009.01)

(52) U.S. Cl.
CPC ............ *H04W 48/16* (2013.01); *H04B 17/23* (2015.01); *H04M 3/42034* (2013.01); *H04W 4/14* (2013.01); *H04W 48/06* (2013.01)

(58) Field of Classification Search
CPC .................................................... H04W 48/16
See application file for complete search history.

(56) References Cited

U.S. PATENT DOCUMENTS

| 2009/0104889 | A1* | 4/2009 | Lotvonen | H04L 63/1441 |
| | | | | 455/410 |
| 2015/0163734 | A1* | 6/2015 | Park | H04W 12/12 |
| | | | | 370/338 |

FOREIGN PATENT DOCUMENTS

| CN | 105516986 A | 4/2016 |
| CN | 105792209 A | 7/2016 |
| WO | 2014094822 A1 | 6/2014 |

OTHER PUBLICATIONS

Zhang, X.M., "Cell Selection/Reselection," SSMC Training Center, Jun. 2004, 37 pages.
"3rd Generation Partnership Project; Technical Specification Group Radio Access Network; User Equipment (UE) procedures in idle mode and procedures for cell reselection in connected mode," 3GPP, Release 7, Technical Specification, Apr. 2007, 38 pages.
(Continued)

*Primary Examiner* — Justin Lee
(74) *Attorney, Agent, or Firm* — Vierra Magen Marcus LLP

(57) ABSTRACT

A device for communicating with a plurality of user equipment in a cellular network comprises a non-transitory memory having instructions and one or more processors in communication with the memory. The one or more processors execute the instructions to receive information regarding a faked base station including an operating frequency, location area code and cell identification of the faked base station, prepare a first message to alert of the faked base station, select the plurality of user equipment that may receive a signal from the faked base station, transmit the first message to alert of the faked base station to the plurality of user equipment and transmit a second message to bar the plurality of user equipment from connecting to the faked base station.

19 Claims, 9 Drawing Sheets

(56) References Cited

OTHER PUBLICATIONS

"3rd Generation Partnership Project; Technical Specification Group GSM/EDGE Radio Access Network; Functions related to Mobile Station (MS) in idle mode and group receive mode," 3GPP, Release 8, Technical Specification, May 2010, 24 pages.
Stuhlfauth, R., "GSM and GPRS System Information," IMAT, St, Version 1.0, Mar. 2002, 62 pages.
ETSI-GSM, "European digital cellular telecommunication system (phase 1); Radio Sub-System Link Control," Technical Specification, Version 3.0.0, Jan. 1991, 23 pages.
Release Note, Recommendation GSM 05.08, Radio Sub-system Link Control, Release 95, phase 1, Dec. 1995, 42 pages.
Digital cellular telecommunications system (Phase 2+); Radio sub-system link control, 3GPP TS 45.008, v. 4.19.0, Release 4, Technical Specification, Sep. 2013, 107 pages.
Data Configuration Manual, GSM9001800 BSS Network Planning Parameters, Reference V3.2, Oct. 2002, 119 pages.
System Information/Layer3 Messages, Telebeans, Power point, converted to pdf on Jul. 29, 2016, 41 pages.
2G layer 3 Messages, MS Word document converted to pdf on Jul. 29, 2016, 15 pages.
PCT/CN2017/095084, ISR, Oct. 23, 2017.

* cited by examiner

RESPONSE MECHANISM FOR DETECTION OF A FAKED BASE STATION

BACKGROUND

Faked base stations (BSs) have been used to launch many attacks on user equipment (UE) in a wireless network. For example, a faked BS may send out spoofing and/or phishing text messages (e.g. short message service (SMS), Instant Messenger message, or email), catch UE identifications (IDs), and/or intercept wireless communications.

While a faked BS may be detected, there may not be an effective mechanism to respond. One way is to send law enforcement personnel to locate the faked BS and bring the operator of the faked BS to legal action. When a faked BS is mounted on a moving vehicle, identifying the precise current location may be difficult. In addition, there may not be an effective way to notify users in the wireless network of the faked BS and/or to prevent (or mitigate) the actions of the faked BS.

SUMMARY

A device for communicating with a plurality of user equipment in a cellular network comprises a non-transitory memory having instructions and one or more processors in communication with the memory. The one or more processors execute the instructions to receive information regarding a faked BS including an operating frequency, location area code and a cell identification of the faked BS and prepare a first message to alert of the faked BS. The one or more processors execute the instructions to select the plurality of user equipment that may receive a signal from the faked BS. The one or more processors execute the instructions to transmit the first message to the plurality of user equipment and a second message to bar the plurality of user equipment from connecting to the faked BS.

In an embodiment, the present technology relates to a computer-implemented method for responding to a faked BS that comprises receiving, with one or more processors, an indication of the faked BS. The one or more processors select a plurality of user equipment in a cellular network to notify regarding the faked BS. A first text message regarding the faked BS is prepared as well as a non-text (i.e. signaling) message that bar the selected user equipment from connecting with the faked BS. The one or more processors transmit the first text message regarding the faked BS and transmit the non-text message so that the selected user equipment do not connect to the faked BS.

In a further embodiment, the present technology relates to a non-transitory computer-readable medium storing computer instructions, that when executed by one or more processors, cause the one or more processors to perform steps. The steps include receive an indication of a faked BS that includes the operating frequency, location area code and the cell identification of the faked BS. A selection as to a plurality of user equipment in a cellular network to notify regarding the faked BS is made and a first text message is prepared regarding the faked BS. A first non-text message is prepared to send that bar the plurality of user equipment from connecting with the faked BS. The first non-text message includes the operating frequency, location area code and the cell identification of the faked BS. A second non-text message is prepared to send to the plurality of user equipment to measure a radio frequency signal from the faked BS. The first text message is transmitted to the plurality of user equipment. The first non-text message is transmitted to the plurality of user equipment so that the plurality of user equipment do not connect to the faked BS. The second non-text message is transmitted to the plurality of user equipment so that the plurality of user equipment measure the radio frequency signal from the faked BS.

This Summary is provided to introduce a selection of concepts in a simplified form that are further described below in the Detailed Description. This Summary and/or headings are not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
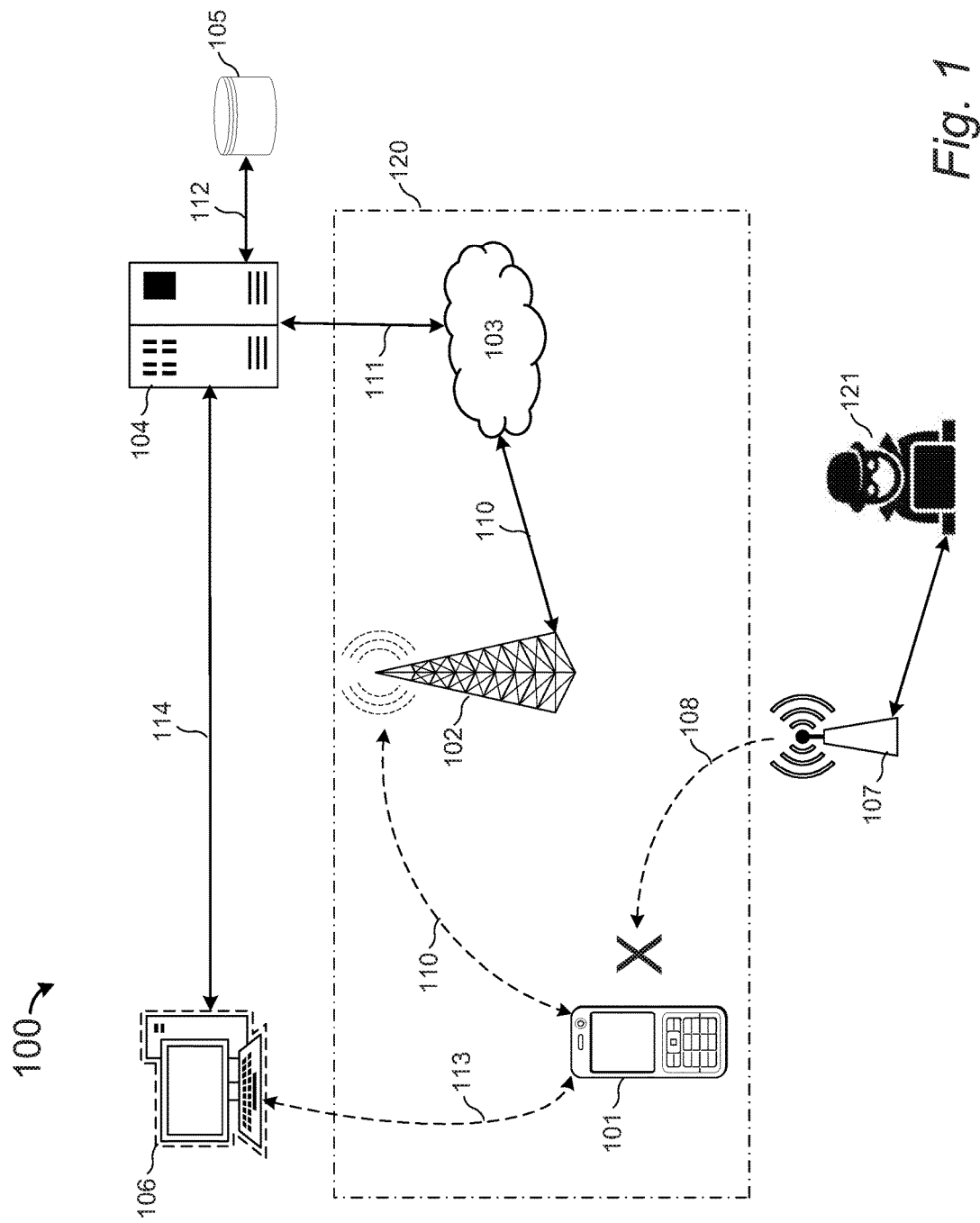
FIG. 1 is a block diagram that illustrates a system for responding to a faked BS according to embodiments of the present technology.

The present technology generally relates to a mechanism, such as a device, system, computer-implemented method and/or non-transitory computer-readable medium storing computer instructions that responds to a detection of a faked BS. The response may include an alert or notification, such as a text message, to selected UE that are nearby the faked BS. A response may also include transmitting a message to selected UE to bar or restrict connecting or communicating with the faked BS. Another transmitted message may direct the selected UE to report the faked BS information such as cell ID, operating frequency, signal strength, other radio frequency (RF) characteristics, location, and/or other information that may mitigate the faked BS. The response may also include other alerts, such as alerting selected UE from acting on suspicious text messages and/or cautioning UE users of suspicious symptoms of intercepted communications, such as a downgraded encryption (e.g. weaker encryption method, no encryption) method, no calling/called ID, suspicious location area code, suspicious cell ID, and/or other suspicious symptoms of intercepted communications.

It is understood that the present technology may be embodied in many different forms and should not be construed as being limited to the embodiments set forth herein. Rather, these embodiments are provided so that this disclosure will be thorough and completely understood. Indeed, the disclosure is intended to cover alternatives, modifications and equivalents of these embodiments, which are included within the scope and spirit of the disclosure as defined by the appended claims. Furthermore, in the following detailed description, numerous specific details are set forth in order to provide a thorough understanding of the technology. However, it will be clear that the technology may be practiced without such specific details.

Faked BSs have been used to launch many attacks such as to send out spoofing and phishing short messages, catching UE IDs, or intercept communications. While there may be methods for detecting a faked BS there may not be an effective mechanism to respond when a faked BS is detected. Law enforcement personnel may be requested to locate the faked BS and bring the faked BS operator to legal action.

Faked BSs may be detected by using a test drive, network detection based on some faked BS characteristics, user complaints and/or UE applications. These detection methods may require time and effort, but also may not detect a faked BS in a timely manner. Since a faked BS is often mounted on a moving vehicle an exact location may not be easily ascertained. When a faked BS is detected, there may not be an effective mechanism to notify the users and prevent nearby UEs from attaching to the faked BS.

There may not be a mechanism to protect the UEs served by a network from attaching to suspicious BSs even before a fake BS is identified.

The present technology, in embodiments, responds to a suspicious or faked BS by: 1) alerting nearby users of UEs of the faked BS, such as via SMS; 2) barring the UEs from connecting to the faked BS; 3) directing users of the UEs near the faked BS to report the faked BS information such as Location Area Code, cell ID, operating frequency, signal strength, and other RF characteristic such as location, etc. which may help mitigate the faked BS; 4) alerting users of the UEs from acting on suspicious SMS messages; 5) cautioning users of the UEs for any suspicious symptom of communication being intercepted, such as a downgraded encryption method, no calling/called ID, suspicious cell ID, and etc.

In an embodiment, a false positive may be possible. In an embodiment, preventive measures may be used to avoid sending an alert without a real faked BS, such as human investigation when a faked BS is detected before sending alerts to users of UEs near the faked BS.

A faked BS can also be used to attack 3G or 4G (3/4G) UEs. Before initiating an attack, a faked BS may jam a 3/4G cellular network in order to have the cellular network revert back to a 2G cellular network. 3/4G cellular networks are typically required to be backward compatible so that a 2G signal is available when a 3/4G signal is not available. Based on a 3rd Generation Partnership Project (3GPP) standard, 2G cellular network and UE authentication is in only one way. In other words, the 2G cellular network authenticates a UE, while there is typically no mechanism for a UE to authenticate a cellular network, or in particular a BS. Therefore, this makes the faked BS attack possible.

FIG. 1 is a diagram that illustrates a system (or apparatus) 100 that responds to a faked BS according to embodiments of the present technology. In embodiments, system 100 includes a mechanism to respond to a faked BS 107 that may be operated by individual 121, such as an faked BS operator or hacker. In other embodiments, a faked BS 107 is not operated by an individual. In an embodiment, system 100 includes multiple computing devices in a wireless network, such as a cellular (or mobile) network 120. For example, cellular network 120 includes BS 102 that communicates with multiple UE, such as UE 101 that may be embodied as a cellular telephone, by way of RF signals 110.

In embodiments, a UE is also known as mobile station (MS). In an embodiment, UE 101 conforms to a SIMalliance, Device Implementation Guide, June 2013 (SIMalliance) specification. In other embodiments, UE 101 does not conform to the SIMalliance specification.

Cellular network 120 may include network 103 that represents other BSs and associated computing/networking devices in other geographical locations as well as electrical interconnections.

Faked BS 107 may send out information by way of RF signals 108 from faked BS 107 to UE 101 in cellular network 120 in order to fraudulently or deceptively obtain user information and/or cellular network information. When user or cellular network information is obtained, individual 121 may use the information to commit crimes, such as theft and/or identity theft. For example, faked BS 107 may launch attacks by sending out spoofing and/or phishing text messages to UE (such as UE 101), catch UE IDs and/or intercept communications between UEs and BS 102.

Law enforcement personnel may have difficulty in locating and preventing the operation of a faked BS. Faked BS 107 may be mounted on a moving vehicle whose location is difficult to identify precisely. Individual 121 may also operate faked BS 107 intermittently making detection and a response more difficult.

Effectively and efficiently warning UE users' of the faked BS may also be difficult. Preventing UE from interacting with faked BS may also be difficult due to the mobile and intermittent nature of some faked BSs.

A response to a detected or suspicious faked BS may occur after complaints from users of UE. For example, a user of UE 101 may complain of suspicious texts to a customer service representative or computing device that may be at a customer service center, such as computing device 106. In an embodiment, UE 101 provides a complaint by way of signal 113 to computing device 106. Signal 113 may be transferred by way of wired or wireless technology. Complaints from users of UE may be forwarded, via signal path 114, from computing device 106 to a computing device 104 that may be located at a network managing location. Computing device 104 is also coupled, via signal path 112, to a memory 105, such as a hard disk drive, that stores historical and other network information of cellular network 120 in the form a data base. Computing device 104 may store as well as retrieve historical and network information to and from memory 105.

A response to a faked BS 107 is output from computing device 104 in an embodiment. A response may include one or more messages to alert a user of a selected UE regarding a faked BS and/or bar a selected UE, such as UE 101, from connecting or attaching to faked BS 107 (as illustrated by "X" in FIG. 1). A response may also include a message to a selected UE to measure information from the faked BS 107, such as RF signal characteristics of RF signals 108. In embodiments, messages are sent from computing device 104 to BS 102, via signal paths 110-111 and network 103, which transmits the messages in the form of RF signals 110 to UE, such as UE 101. Replies from UE, such as measured values or information from the faked BS 107, are transmitted by the selected UE, such as UE 101, to BS 102 and transferred to computing device 104 via signal paths 110-11 and network 103.

In embodiments, a mechanism to respond to a faked BS includes computer instructions stored and executed by computing device 104. In other embodiments, the mechanism further includes signal paths 110-111, network 103 and BS 102 that radiates RF signals 110. In still a further embodiment, the mechanism further includes computer instructions stored and executed on UE 101 that replies to messages in the form of RF signals 110 from BS 102.

In embodiments, BS 102 may include one or more directional antennas or an array of antennas mounted on a cell tower as well as electronics to transmit and receive RF signals to and from UE. In embodiments, BS 102 include one or more transceivers to transmit and receive RF signals to and from UE in a wireless network. In embodiments, BS 102 includes a computing device to transfer messages to and from UE.

In embodiments, BS 102 may be second generation (2G), third generation (3G) and/or fourth generation (4G) BS. In embodiments, different types of cellular technologies may be used, such as Global System for Mobile Communications (GSM), code division multiple access (CDMA), Time division multiple access (TDMA) and Advanced Mobile Phone System (AMPS) (analog). In embodiments, different types of digital cellular technologies may be used, such as: GSM, General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN).

In embodiments, BS 102 may be an E-UTRAN Node B (eNodeB), Node B and/or Base Transceiver Station (GBTS) BS. A GBTS may operate a variety of types wireless technology, such as CDMA, GSM, Worldwide Interoperability for Microwave Access (WiMAX) or Wi-Fi. A GBTS may include equipment for the encryption and decryption of communications, spectrum filtering equipment, antennas and transceivers. A GBTS typically has multiple transceivers that allow it to serve many of the cell's different frequencies and sectors.

FIGS. 2-5 are flowcharts (FIG. 2 being a call flow diagram) that illustrate methods to respond to a faked BS according to embodiments of the present technology. In embodiments, flowcharts in FIGS. 2-5 are computer-implemented methods performed, at least partly, by hardware and software components illustrated in FIGS. 1 and 6-8 and as described below. In an embodiment, software components in FIGS. 7-8, executed by one or more processors, such as processor 610 shown in FIG. 6, perform at least a portion of the methods.

Figure 2:
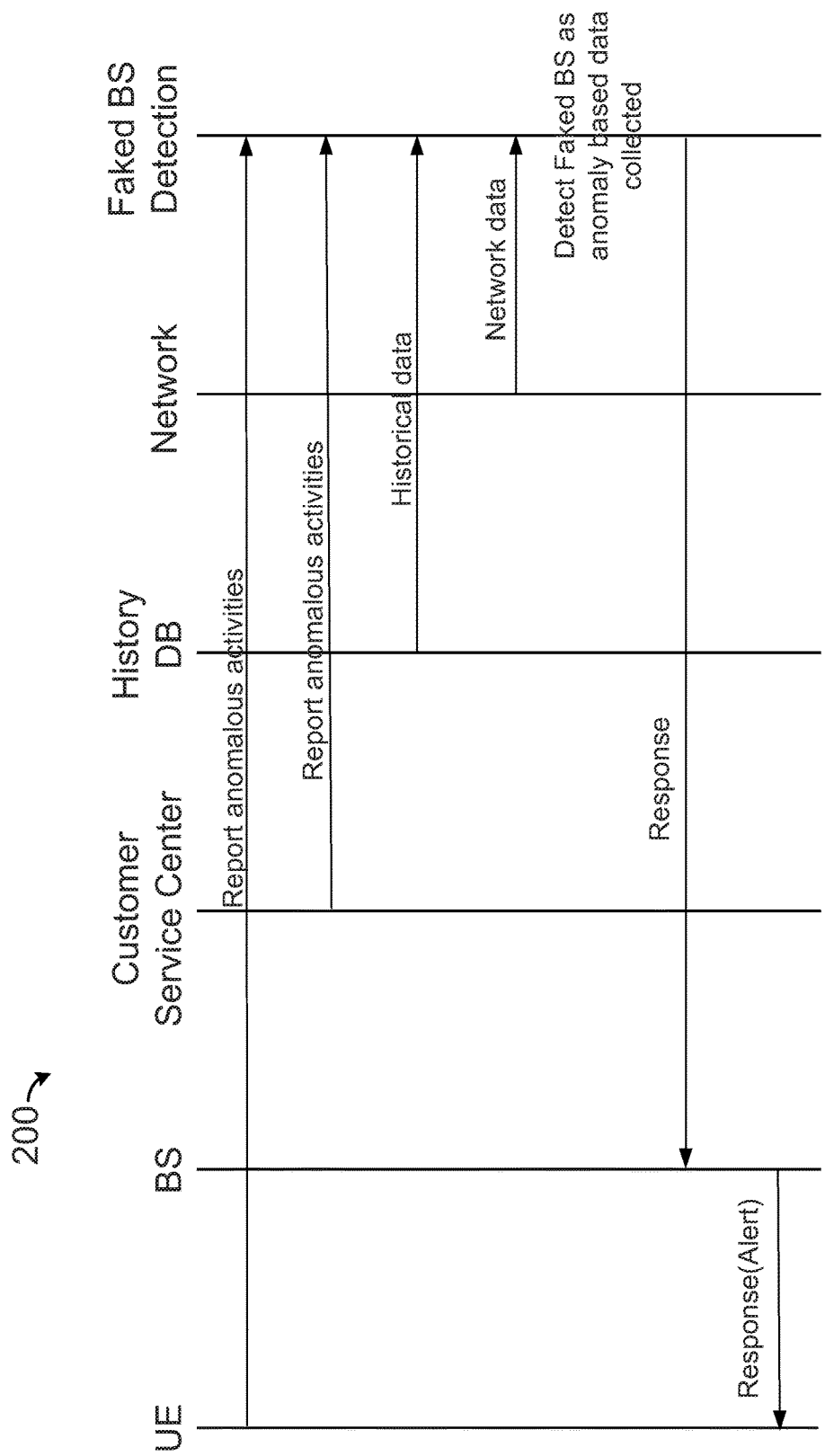
FIG. 2 is a sequence diagram for responding to a faked BS according to embodiments of the present technology.

FIG. 2 is a flowchart that illustrates a method 200 to respond to a faked BS according to embodiments of the present technology. In embodiments, information is obtain to determine whether a faked or suspicious BS is transmitting in a network, such as cellular network 120. For example, reports of anomalous activities are obtained from one or more UE, reports of anomalous activities are obtained from a customer service center, historical data regarding the cellular network is obtained from a data base (History DB) and network data is obtained from the network. A faked BS may be determined based on the anomalous data and/or other information or baselines. In alternate embodiments, subsets of the anomalous information and/or other information may be used to determine whether a faked BS is operating in the wireless network.

When a determination is made that a faked BS is present in a general location or in a particular cell, a response (which may include an alert) is sent to one or more BSs that are in the same general location or cell. In embodiments, a response may be sent to multiple BSs in the same general physical location (e.g. tracking area or a routing area) of the faked BS or to multiple cells. The BS(s) then transmits the received response in the form of RF signals to selected UE. In an embodiment, a legitimate BS transmits the response to all UE currently attached, connected or actively communicating with the legitimate BS.

Figure 3:
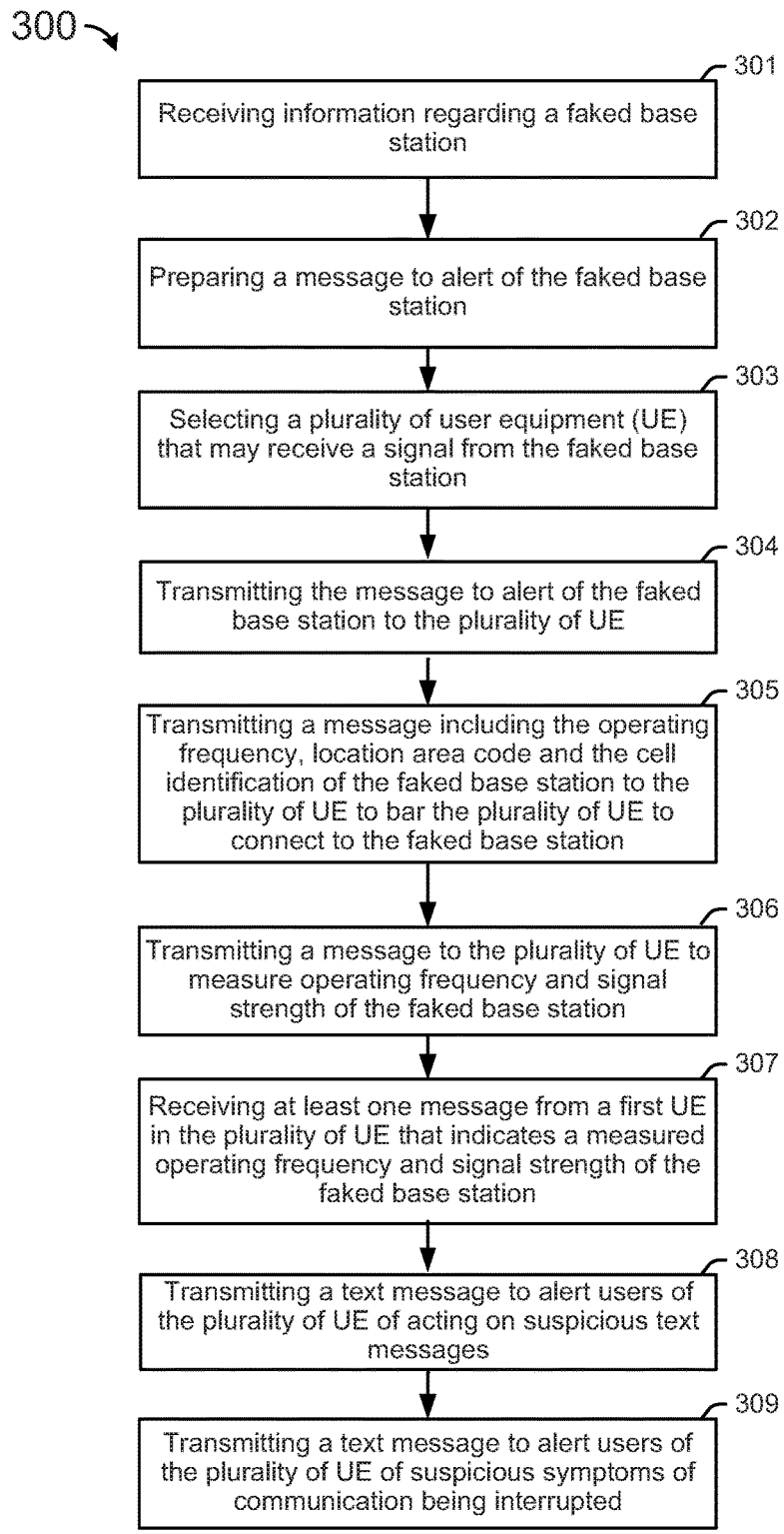
FIG. 3 is a flowchart that illustrates a method for responding to a faked BS according to embodiments of the present technology.

FIG. 3 is a flowchart that illustrates a method 300 for responding to a faked BS according to embodiments of the present technology. In FIG. 3 at 301, information regarding a faked BS is received. In an embodiment, receive 701 executed by processor 610 performs at least a portion of this function as described herein and illustrated in FIGS. 6-7. In an embodiment, the information includes at least an operating frequency, location area code and cellular ID of the faked BS. In another embodiment, information regarding a suspected faked BS is received.

At 302 a message to alert of the faked BS is prepared. In an embodiment, prepare message 702 executed by processor 610 performs at least a portion of this function. In an embodiment, a prepared message may alert selected UE of a faked BS or acting on suspicious text. In an embodiment, a prepared message may alert UE of suspicious symptoms of communication interruptions. In another embodiment, a prepared message may direct selected UE from connecting or attaching to a faked BS and/or measure information from the faked BS.

At 303 a plurality of UE are selected that may receive a signal from the faked BS. In an embodiment, select UE 703 executed by processor 610 performs at least a portion of this function. In an embodiment, UE in a cellular region of the faked BS that are already attached to one or more legitimate BSs are selected. In other embodiments, UE are selected as described herein.

At 304 a message to alert of a detected or suspicious faked BS is transmitted to the plurality of selected UE. In an embodiment, transmit 704 executed by processor 610 performs at least a portion of this function.

At 305 a message including the operating frequency, location area code and cell ID of the faked BS is transmitted to the plurality of selected UE to bar the plurality of UE of connecting or attaching (communicating with) to the faked BS. In an embodiment, transmit 704 executed by processor 610 performs at least a portion of this function.

At 306 a message to measure operating frequency and signal strength of the faked BS is transmitted to a plurality of selected UE. In an embodiment, transmit 704 executed by processor 610 performs at least a portion of this function.

At 307 at least one message from a first UE in the plurality of UE is received that indicates a measured operating frequency and signal strength of the faked BS. In an embodiment, receive 701 executed by processor 610 performs at least a portion of this function.

At 308 a text message to alert users of acting on suspicious text messages is transmitted. In an embodiment, transmit 704 executed by processor 610 performs at least a portion of this function.

At 309 a text message to alert users of suspicious symptoms of communication being interrupted is transmitted. In an embodiment, transmit 704 executed by processor 610 performs at least a portion of this function.

Figure 4:
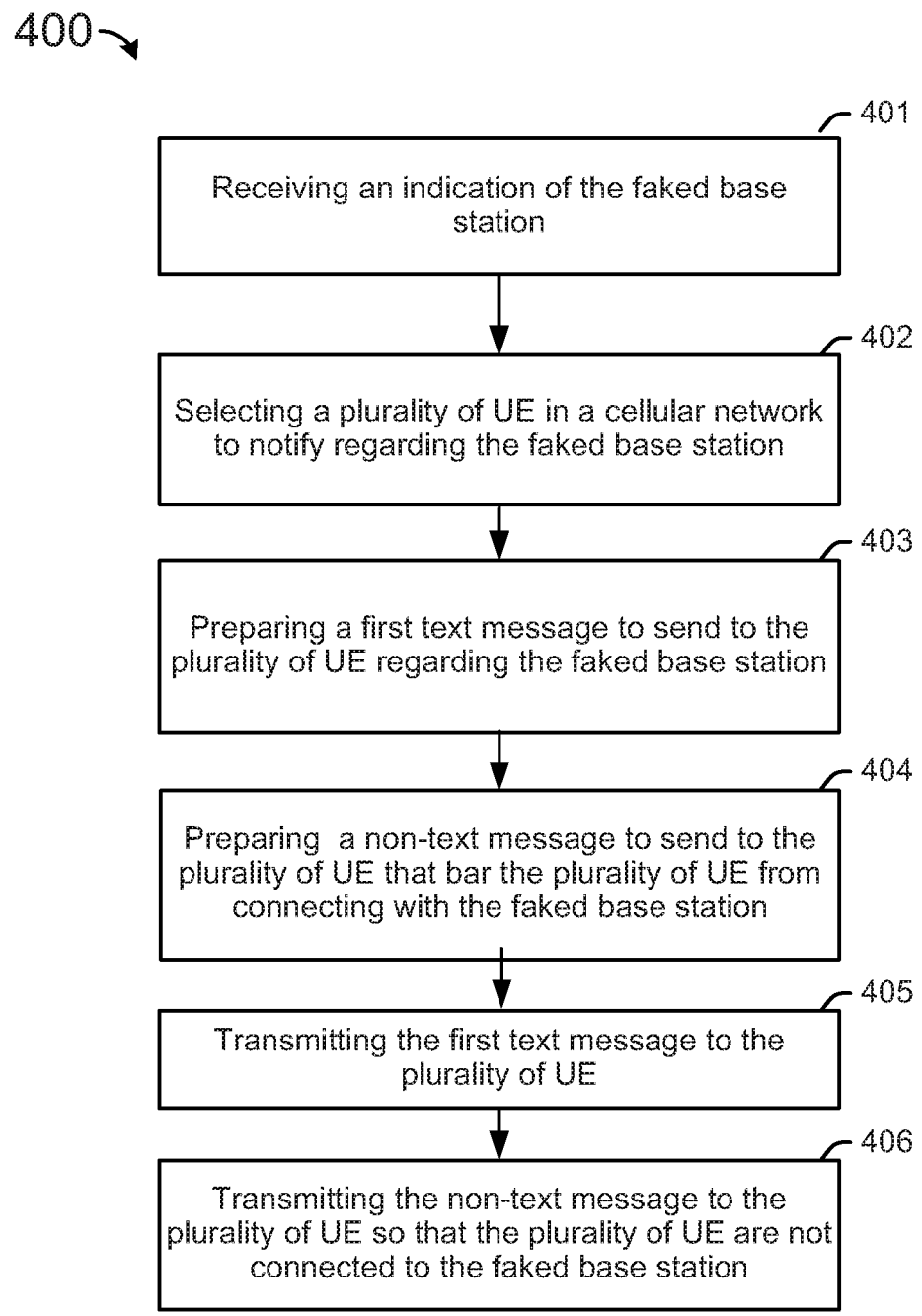
FIG. 4 is a flowchart that illustrates a method for responding to a faked BS according to embodiments of the present technology.

FIG. 4 is a flowchart that illustrates a method 400 for responding to a faked BS in a cellular network according to embodiments of the present technology. At 401 an indication of the faked BS is received. In an embodiment, receive 701 executed by processor 610 performs at least a portion of this function. In an embodiment, the information includes at least an operating frequency, location area code and cellular ID of the faked BS. In another embodiment, information regarding a suspected faked BS is received.

At 402 a plurality of UE are selected in a cellular network to notify regarding the faked BS. In an embodiment, select UE 703 executed by processor 610 performs at least a portion of this function. In an embodiment, UE in a cellular region of the faked BS that are already attached to one or more legitimate BSs are selected. In other embodiments, UE are selected as described herein.

At 403 a first text message is prepared to send to the selected plurality of UE regarding the faked BS. In an embodiment, prepare message 702 executed by processor 610 performs at least a portion of this function.

At 404 a non-text message is prepared to send to the plurality of UE that bar the plurality of UE from connecting (communicating) with the faked BS. In an embodiment, prepare message 702 executed by processor 610 performs at least a portion of this function.

At 405 the first text message is transmitted to the selected plurality of UE. In an embodiment, transmit 704 executed by processor 610 performs at least a portion of this function.

At 406 the non-text message is transmitted to the selected plurality of UE so that the selected plurality of UE are not connected to the faked BS. In an embodiment, transmit 704 executed by processor 610 performs at least a portion of this function.

Figure 5:
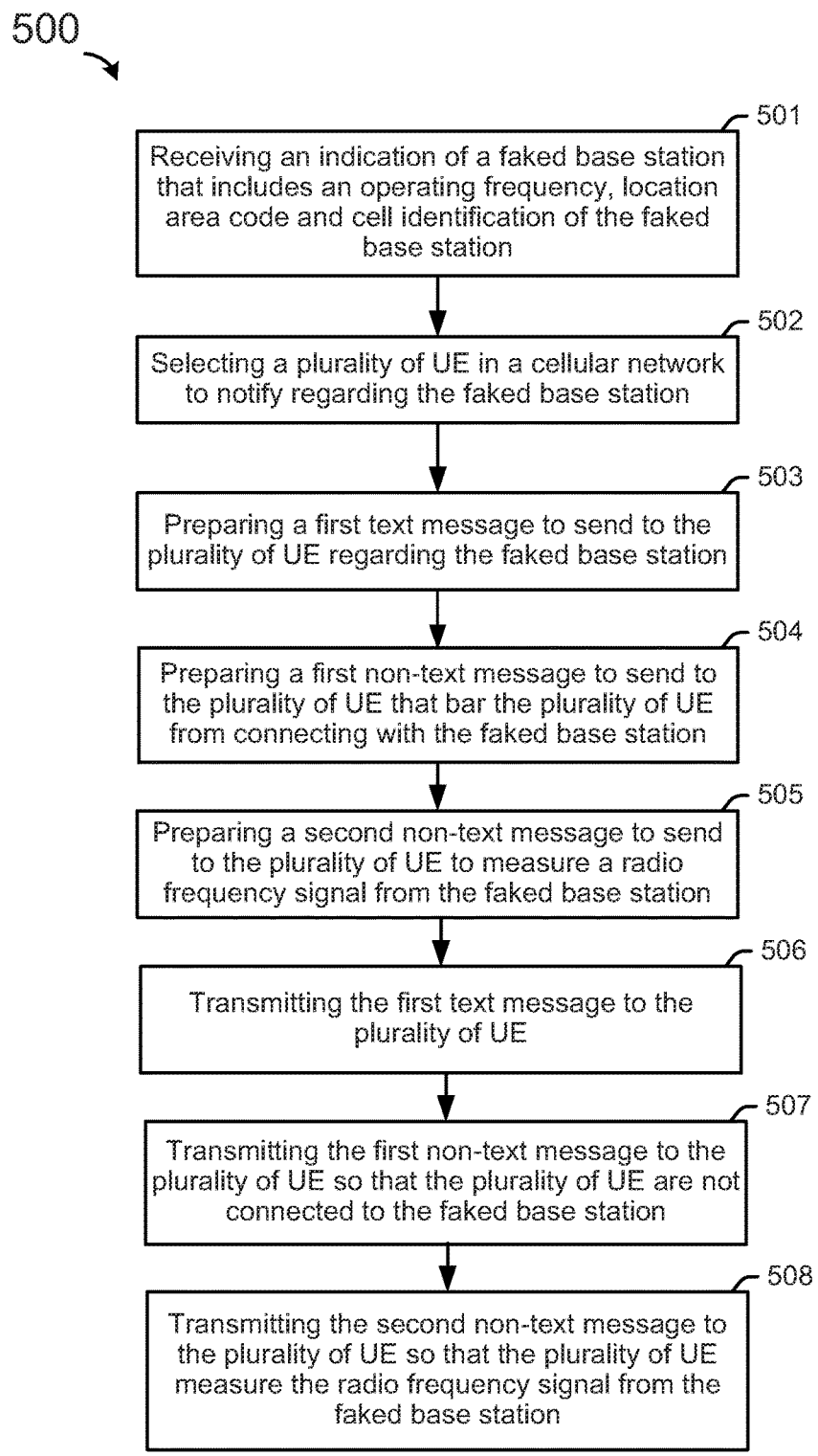
FIG. 5 is a flowchart that illustrates a method for responding to a faked BS according to embodiments of the present technology.

FIG. 5 illustrates a method 500 to respond to a faked BS in a cellular network according to embodiments of the present technology.

At 501 an indication of a faked BS that includes an operating frequency, location area code and cell ID of the faked BS is received. In an embodiment, receive 701 executed by processor 610 performs at least a portion of this function.

At 502 a plurality of UE in a cellular network are selected to notify regarding the faked BS. In an embodiment, select UE 703 executed by processor 610 performs at least a portion of this function.

At 503 a first text message to send to the selected plurality of UE regarding the faked BS is prepared. In an embodiment, prepare message 702 executed by processor 610 performs at least a portion of this function.

At 504 a first non-text message to send to the selected plurality of UE that bar the plurality of UE from connecting with the faked BS is prepared. In an embodiment, prepare message 702 executed by processor 610 performs at least a portion of this function.

At 505 a second non-text message is prepared to send to the selected plurality of UE to measure a RF signal from the faked BS. In an embodiment, prepare message 702 executed by processor 610 performs at least a portion of this function.

At 506 the first text message is transmitted to the selected plurality of UE. In an embodiment, transmit 704 executed by processor 610 performs at least a portion of this function.

At 507 the first non-text message is transmitted to the selected plurality of UE so that the plurality of UE are not connected to the faked BS. In an embodiment, transmit 704 executed by processor 610 performs at least a portion of this function.

At 508 the second non-text message is transmitted to the selected plurality of UE so that the plurality of UE measure the RF signal from the faked BS. In an embodiment, transmit 704 executed by processor 610 performs at least a portion of this function.

Figure 6:
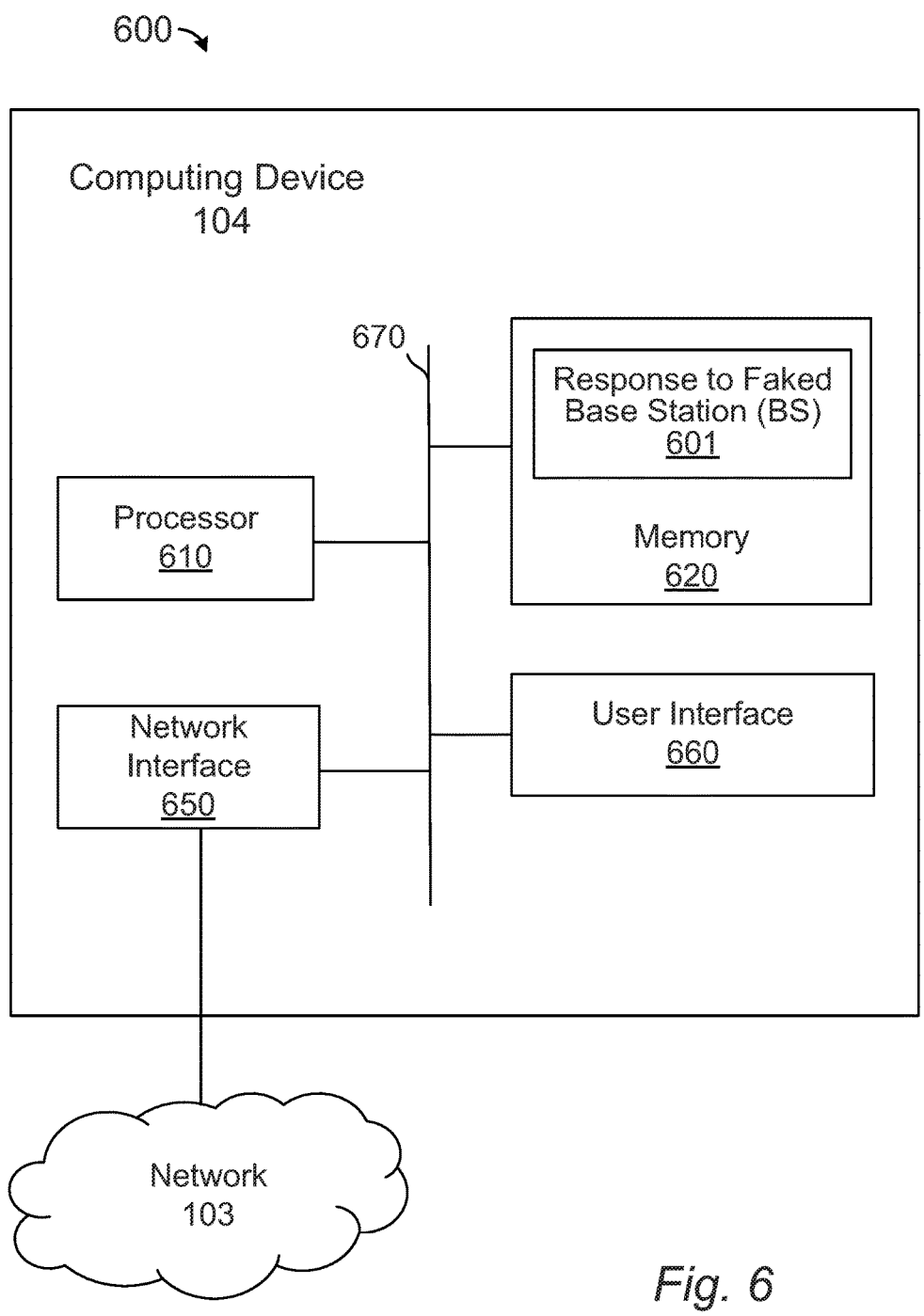
FIG. 6 is a block diagram that illustrates a hardware architecture for responding to a faked BS according to embodiments of the present technology.

FIG. 6 illustrates a hardware architecture 600 for computing device 104 used to respond to a faked BS, such as faked BS 107. Computing device 104 may include a processor 610, memory 620, a user interface 660 and network interface 650 coupled by a interconnect 670. Interconnect 670 may include a bus for transferring signals having one or more type of architectures, such as a memory bus, memory controller, a peripheral bus or the like.

Computing device 104 may be implemented in various embodiments. Computing devices may utilize all of the hardware and software components shown, or a subset of the components in embodiments. Levels of integration may vary depending on an embodiment. For example, memory 620 may be divided into many more memories. Furthermore, a computing device 104 may contain multiple instances of a component, such as multiple processors (cores), memories, databases, transmitters, receivers, etc. Computing device 104 may comprise a processor equipped with one or more input/output devices, such as network interfaces, storage interfaces, and the like.

In an embodiment, computing device 104 may be a mainframe computer that accesses a large amount of data related to a cellular network stored in a database. In alternate embodiment, computing device 104 may be embodied as different type of computing device. In an embodiment, types of computing devices include but are not limited to, wearable, personal digital assistant, cellular telephone, tablet, netbook, laptop, desktop, embedded, server, mainframe and/or super (computer).

Memory 620 stores response to faked BS 601 that includes computer instructions embodied in a computer program. In embodiments, other computer programs such as an operating system having a scheduler, application(s) and a database are stored in memory 620.

In an embodiment, processor 610 may include one or more types of electronic processors having one or more cores. In an embodiment, processor 610 is an integrated circuit processor that executes (or reads) computer instructions that may be included in code and/or computer programs stored on a non-transitory memory to provide at least some of the functions described herein. In an embodiment, processor 610 is a multi-core processor capable of executing multiple threads. In an embodiment, processor 610 is a digital signal processor, baseband circuit, field programmable gate array, digital logic circuit and/or equivalent.

A thread of execution (thread or hyper thread) is a sequence of computer instructions that can be managed independently in one embodiment. A scheduler, which may be included in an operating system, may also manage a thread. A thread may be a component of a process, and multiple threads can exist within one process, executing concurrently (one starting before others finish) and sharing resources such as memory, while different processes do not share these resources. In an embodiment, the threads of a process share its instructions (executable code) and its context (the values of the process's variables at any particular time).

In a single core processor, multithreading is generally implemented by time slicing (as in multitasking), and the single core processor switches between threads. This context switching generally happens often enough that users perceive the threads or tasks as running at the same time. In a multiprocessor or multi-core processor, multiple threads can be executed in parallel (at the same instant), with every processor or core executing a separate thread at least partially concurrently or simultaneously.

Memory 620 may comprise any type of system memory such as static random access memory (SRAM), dynamic random access memory (DRAM), synchronous DRAM (SDRAM), read-only memory (ROM), a combination thereof, or the like. In an embodiment, a memory 620 may include ROM for use at boot-up, and DRAM for program and data storage for use while executing computer instructions. In embodiments, memory 620 is non-transitory or non-volatile integrated circuit memory storage.

Further, memory 620 may comprise any type of memory storage device configured to store data, store computer programs including instructions, and store other information and to make the data, computer programs, and other information accessible via interconnect 670. Memory 620 may comprise, for example, one or more of a solid state drive, hard disk drive, magnetic disk drive, optical disk drive, or the like.

Computing device 104 also includes one or more network interfaces 650, which may comprise wired links, such as an Ethernet cable or the like, and/or wireless links to access network 103. A network interface 650 allows computing device 104 to communicate with remote computing devices and/or BSs via signal paths 110-111 and network 103. For example, a network interface 650 may provide wireless communication via one or more transmitters/transmit antennas and one or more receivers/receive antennas.

Computing device 104 communicates or transfers information by way of network 103 and signal paths 110-111. In an embodiment, network 103 include a plurality of BSs in a cellular network or geographical regions and associated electronic interconnections. In an embodiment, network 103 may be wired or wireless, singly or in combination. In an embodiment, network 103 may be the Internet, a wide area network (WAN) or a local area network (LAN), singly or in combination.

In an embodiment, network 103 may include a High Speed Packet Access (HSPA) network, or other suitable wireless systems, such as for example Wireless Local Area Network (WLAN) or Wi-Fi (Institute of Electrical and Electronics Engineers' (IEEE) 802.11x). In an embodiment, computing device 104 uses one or more protocols to transfer information or packets, such as Transmission Control Protocol/Internet Protocol (TCP/IP) packets.

In embodiments, computing device 104 includes input/output (I/O) computer instructions as well as hardware components, such as I/O circuits to receive and output information from and to other computing devices and/or BSs, via network 103 and signal paths 110-111. In an embodiment, an I/O circuit may include at least a transmitter and receiver circuit.

In embodiments, functions described herein are distributed to other or more computing devices. In embodiments, computing device 104 may act as a server that provides a service while one or more UE, computing devices and/or associated BSs may act as a client. In an embodiment, computing device 104 and another computing device may act as peers in a peer-to-peer (P2P) relationship.

User interface 660 may include computer instructions as well as hardware components in embodiments. A user interface 660 may include input devices such as a touchscreen, microphone, camera, keyboard, mouse, pointing device and/or position sensors. Similarly, a user interface 660 may include output devices, such as a display, vibrator and/or speaker, to output images, characters, vibrations, speech and/or video as an output. A user interface 660 may also include a natural user interface where a user may speak, touch or gesture to provide input.

Figure 7:
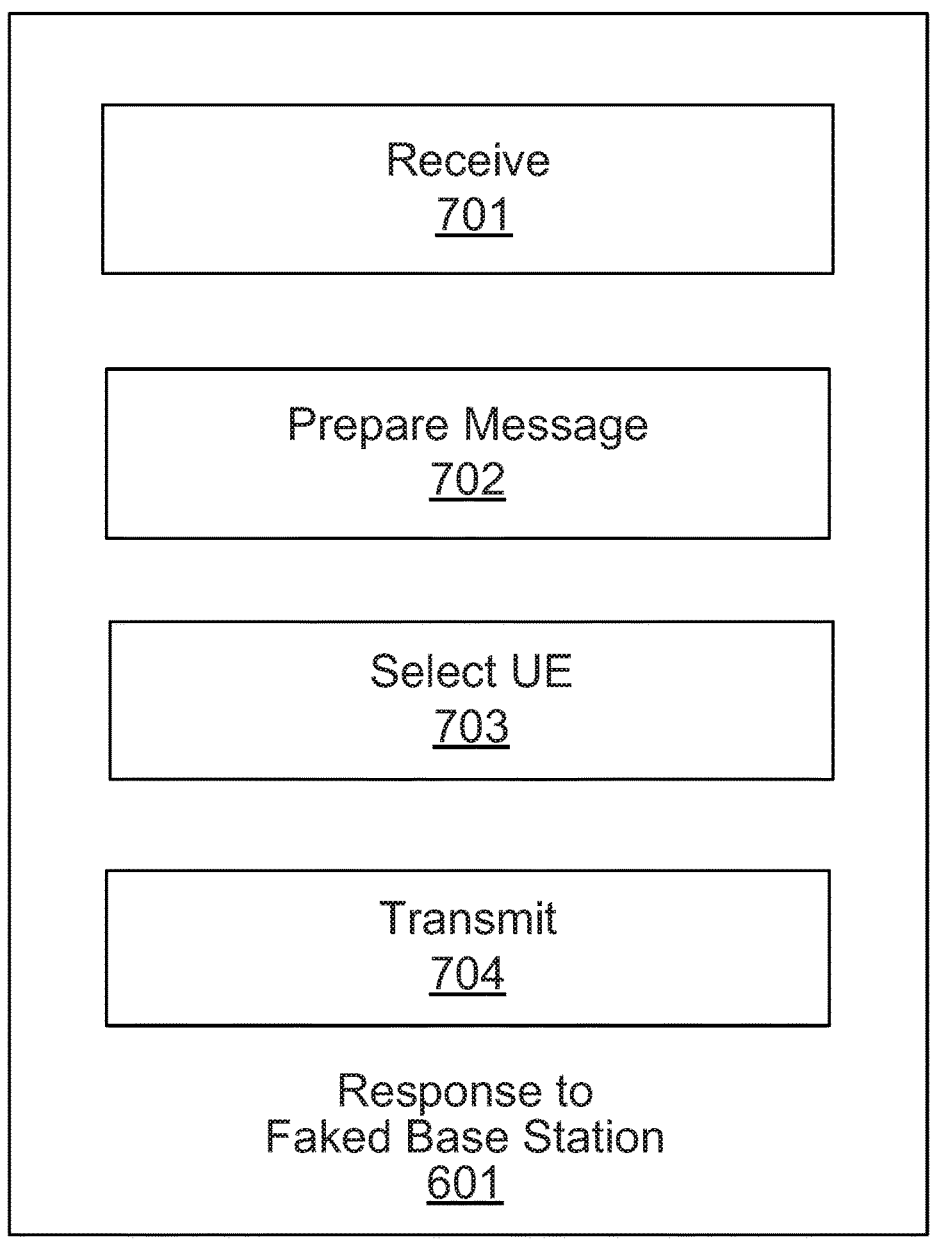
FIG. 7 is a block diagram that illustrates a software architecture for responding to a faked BS according to embodiments of the present technology.

FIG. 7 illustrates a software architecture 700 according to embodiments of the present technology. Software architecture 700 illustrates software components having computer instructions to respond to a faked BS. In embodiments, software components illustrated in software architecture 700 are stored in memory 620 of FIG. 6. In embodiments, software components illustrated in FIG. 7 may be embodied as a computer program, object, function, subroutine, method, software instance, script, a code fragment, stored in an electronic file, singly or in combination. In order to clearly describe the present technology, software components shown in FIG. 7 are described as individual software components. In embodiments, the software components illustrated in FIG. 7, singly or in combination, may be stored (in single or distributed computer-readable storage medium(s)) and/or executed by a single or distributed computing device (processor or multi-core processor) architecture. Functions performed by the various software components described herein are exemplary. In other embodiments, software components identified herein may perform more or less functions. In embodiments, software components may be combined or further separated.

In embodiments, software architecture 700 includes receive 701, prepare message 702, select UE 703 and transmit 704.

Receive 701 is responsible for, among other functions, receiving an indication of a faked BS. In embodiment, the indication of the faked BS may include the current physical location or current cellular ID of the cell in which the faked BS is located. In an embodiment, an indication of a faked BS may including the faked BS operating frequency, location area code and cellular ID being used by the faked BS. In embodiments, receive 701 receives measurement values from a selected UE that received a message to measure faked BS information, such as RF characteristics. In embodiments, measurement values include location area code, cell ID, operating frequency, signal strength, other RF signal characteristics, location, and/or other information that may mitigate the faked BS.

Prepare message 702 is responsible for, among other functions, preparing or generating messages to be transmitted to selected UE. In embodiments, the messages may include one or more text messages (such as short message service (SMS) text) or non-text messages that may include control information (or code) for a selected UE. In embodiments, a text message may include audio and/or video. The text messages may alert or warn users of UE of the present of a faked BS. A non-text message may include control information to bar or restrict a particular or selected UE from connecting or communicating with the faked BS. Other types of non-text messages may direct particular UE to report faked BS information such as cell ID, operating frequency, signal strength, other RF characteristic, location, and/or other information that may mitigate the faked BS. Other text messages may include further alerts or cautions, such as alerting users of acting on suspicious text messages and/or cautioning users of suspicious symptoms of intercepted communications, such as a downgraded encryption method, no calling/called ID, suspicious location area code, suspicious cell ID, and/or other suspicious symptoms of intercepted communications. In embodiments, a single or multiple text message may include alert and/or caution information for users.

In an embodiment, a non-text message may be sent to a UE according to 3GPP specifications, such as 3GPP TS 23.122 V8.2.0 (2008-06), Technical Specification Group Core Network and Terminals; Non-Access-Stratum (NAS) functions related to Mobile Station (MS) in idle mode (Release 8). In an embodiment, "3GPP specifications" covers all GSM (including GPRS and EDGE), W-CDMA (including HSPA) and Long Term Evolution (LTE) (including LTE-Advanced) specifications. The following describe other types of 3G technology: UMTS Terrestrial Radio Access Network (UTRAN), UMTS (in Europe) and Freedom of Mobile Multimedia Access (FOMA) (in Japan).

In an embodiment, a non-text message to bar connecting to a faked BS may include a location area (LA) code that forbids a selected UE that receives the LA code from connecting in the faked BS neighborhood to access the faked BS.

3GPP specifications specifies a Forbidden LA list for each UE for the purpose of "forbidden location areas for regional provision of service". In an embodiment, a UE 101 is barred or prevented from accessing any BS that is included in this Forbidden LA list. In an embodiment, a Forbidden LA list is automatically learned when an UE receives a Location Registration Reject message to avoid repetitive attempts to access a forbidden LA.

In an embodiment, Over The Air (OTA) technology and/or standard is used to transfer the non-text message including the LA code or add the LA that the faked BS uses to this Forbidden LA list in a selected UE to prevent the selected UE in the neighborhood of the faked BS to access the faked BS.

In embodiments, one or more non-text messages that are sent to selected UEs to measure faked BS information may be similarly prepared and sent. In embodiments, a message may be sent as at least partially described in the 3GPP TS 37.320, Minimization of Drive Test (MDT) for collection network radio measurements specification.

In embodiments, non-text messages may be prepared and sent that do not conform to the 3GPP specifications.

Select UE 703 is responsible for, among other functions, selecting which UE to receive particular text and non-text messages. In an embodiment, each UE that is currently connecting or communicating with a BS located in a cell where the faked BS is located receives selected text and non-text messages. In embodiments, a selected UE from different cells receive text and non-text messages, such as UEs in cells that a mobile faked BS is moving towards. In embodiments, UEs that receive text and non-text messages are selected based on their physical proximity to the faked BS or whether a particular UE has received a suspicious text or suspicious symptoms of interrupted communication. In still a further embodiment, UEs may be selected based on received measurement information regarding the faked BS. For example, UEs may be selected that have received a particular threshold signal strength from a RF signal transmitted by the faked BS.

Transmit 704 is responsible for, among other functions, transmitting selected text and non-text messages prepared by prepare message 702 and selected by select UE 703.

Figure 8:
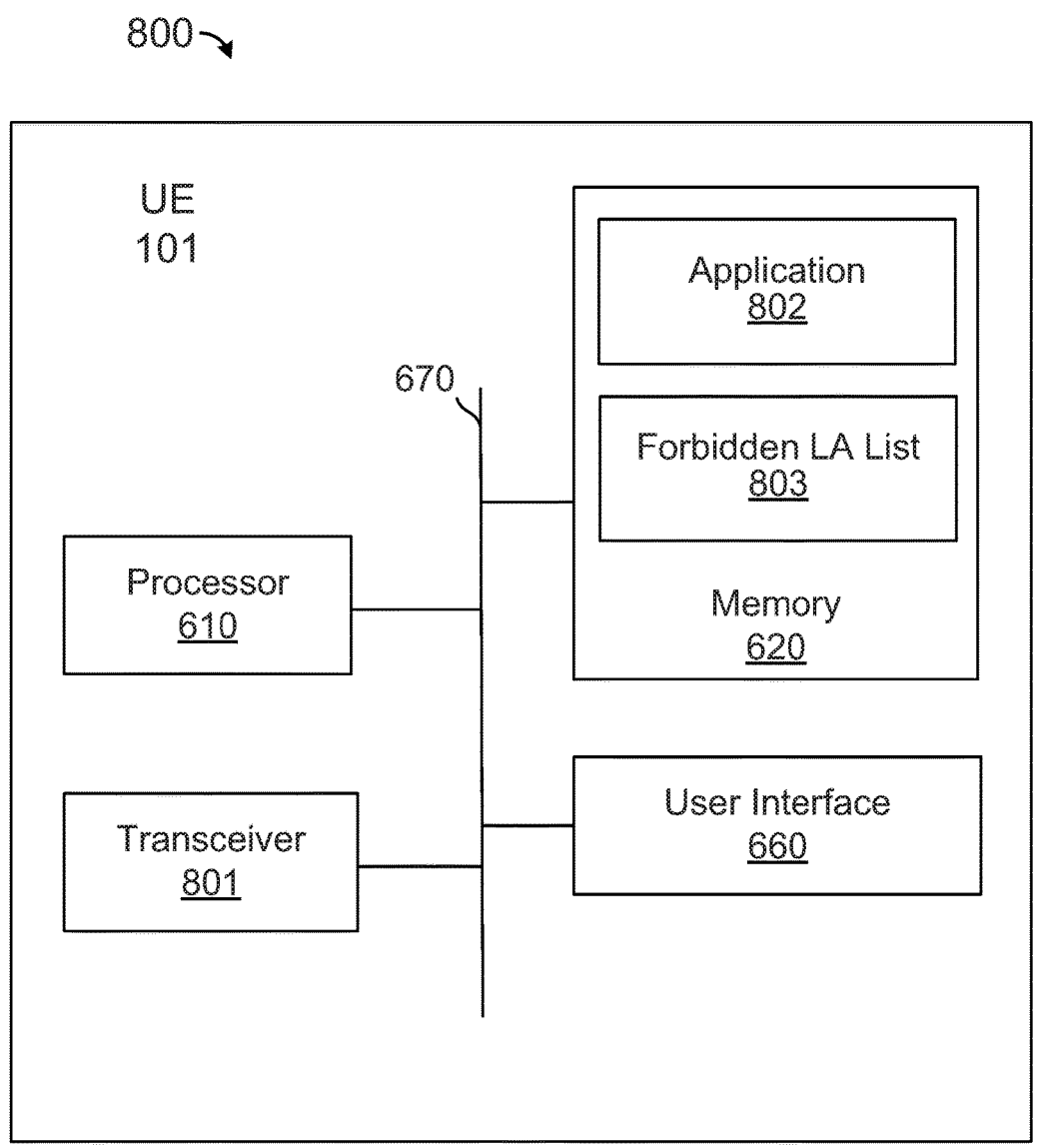
FIG. 8 is a block diagram that illustrates a hardware and software architecture for a UE according to embodiment of the present technology.

FIG. 8 is a block diagram that illustrates a hardware and software architecture for a UE 101 according to embodiment of the present technology. In an embodiment, UE 101 is a computing device embodied as a cellular telephone. In other embodiments, UE 101 may be other types of computing devices that transmit and receive RF signals in a wireless network. UE 101 includes processor 610, memory 620, user interface 660 and interconnect 670 as similarly described herein. In embodiments, processor 610, memory 620, user interface 660 and interconnect 670 are hardware components that are sized and connected for a cellular telephone. In an embodiment, UE 101 also includes a transceiver 801 coupled to interconnect 670 to transmit and receive RF signals in a wireless network.

In an embodiment, application 802 and Forbidden LA list 803 are computer instructions and/or data in the form of one or more computer programs stored in memory 620 and executed/accessed by processor 610 in UE 101. In another embodiment, UE 101 receives a LA code in a non-text message by way of a received RF signal and OTA technology from a legitimate BS, such as BS 102, in order to bar connecting to faked BS 107 by updating Forbidden LA list 803.

In an embodiment, application 802 receives and displays text messages that alert and/or caution a user of UE 101 regarding faked BS 107.

In an embodiment, application 802 receives a non-text message from BS 102, such as a non-text message that indicates that UE 101 measure information of faked BS 107. Application 802 then may cause UE 101 to measure information of a faked BS, such as RF signal characteristics transmitted from faked BS 107. Measured values may then be stored and transmitted back in a reply message to BS 102 in the form of RF signals transmitted by transceiver 801.

In embodiments, UE 101 does not include application 802 and/or Forbidden LA list 803.

Figure 9:
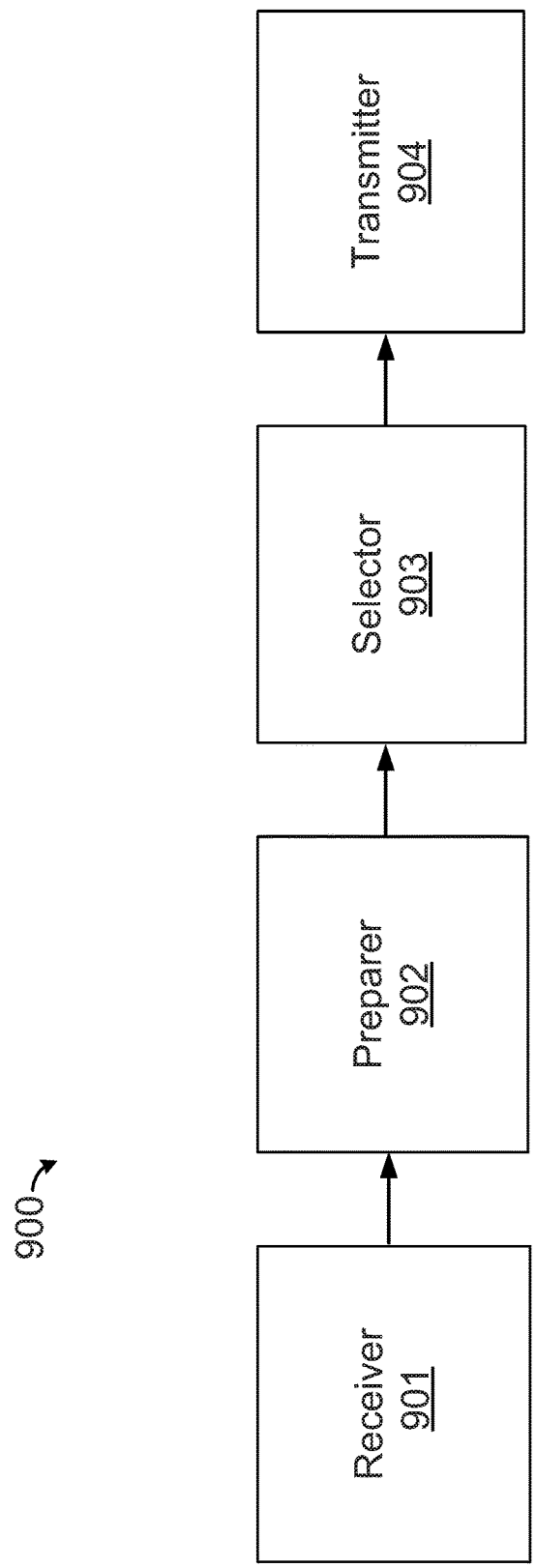
FIG. 9 is a block diagram that illustrates responding to a faked BS according to embodiments of the present technology.

FIG. 9 is a block diagram of system 900 that illustrates responding to a faked BS according to embodiments of the present technology. In an embodiment, system 900 includes receiver 901, preparer 902, selector 903 and transmitter 904. In embodiments, receiver 901 receives information regarding a faked base station including an operating frequency, location area code and cell identification of the faked base station. In embodiments, preparer 902 prepares text and/or non-text messages to be sent. For example, preparer 902, among other messages, prepares a first message to alert of the faked base station and/or a second message to bar the plurality of user equipment from connecting to the faked base station. In an embodiment, selector 903 selects the plurality of user equipment that may receive at least the first and/or second messages. Transmitter 904 transmits messages, such as text and non-text messages, in embodiments.

Advantages of the present technology may include, but are not limited to, enhanced effectiveness, flexibility, maintainability and scalability. The present technology may be flexible in selecting particular UE to alert or bar from connecting to a faked BS and effective in high dimensional space. The present technology may prevent a selected UE from attaching to a faked BS (or a suspected faked BS) and may also direct selected UE to measure information of the faked BS, such as RF characteristics. The present technology may be automatic, dynamically adaptive and comprehensive as compared to some fixed rule, ad hoc and/or manual faked BS technology.

The flowcharts and block diagrams in the figures illustrate the architecture, functionality, and operation of possible implementations of a device, apparatus, system, computer-readable medium and method according to various aspects of the present disclosure. In this regard, each block (or arrow) in the flowcharts or block diagrams may represent operations of a system component, software component or hardware component for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block (or arrow) of the block diagrams and/or flowchart illustration, and combinations of blocks (or arrows) in the block diagram and/or flowchart illustration, can be implemented by special purpose hardware-based systems that perform the specified functions or acts, or combinations of special purpose hardware and computer instructions.

It will be understood that each block (or arrow) of the flowchart illustrations and/or block diagrams, and combinations of blocks (or arrows) in the flowchart illustrations and/or block diagrams, may be implemented by non-transitory computer instructions. These computer instructions may be provided to and executed (or read) by a processor of a general purpose computer (or computing device), special purpose computer, or other programmable data processing apparatus to produce a machine, such that the instructions executed via the processor, create a mechanism for implementing the functions/acts specified in the flowcharts and/or block diagrams.

As described herein, aspects of the present disclosure may take the form of at least a system, device having one or more processors executing instructions stored in non-transitory memory, a computer-implemented method, and/or non-transitory computer-readable storage medium storing computer instructions.

Non-transitory computer-readable media includes all types of computer-readable media, including magnetic storage media, optical storage media, and solid state storage media and specifically excludes signals. It should be understood that software including computer instructions can be installed in and sold with a computing device having computer-readable storage media. Alternatively, software can be obtained and loaded into a computing device, including obtaining the software via a disc medium or from any manner of network or distribution system, including, for example, from a server owned by a software creator or from a server not owned but used by the software creator. The software can be stored on a server for distribution over the Internet, for example.

More specific examples of the computer-readable medium include the following: a portable computer diskette, a hard disk, a random access memory (RAM), ROM, an erasable programmable read-only memory (EPROM or Flash memory), an appropriate optical fiber with a repeater, a portable compact disc read-only memory (CD-ROM), an optical storage device, a magnetic storage device, or any suitable combination thereof.

Non-transitory computer instructions used in embodiments of the present technology may be written in any combination of one or more programming languages. The programming languages may include an object oriented programming language such as Java, Scala, Smalltalk, Eiffel, JADE, Emerald, C++, CII, VB.NET, Python, R or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The computer instructions may be executed entirely on the user's computer (or computing device), partly on the user's computer, as a stand-alone software package, partly on the user's computer and partly on a remote computer, or entirely on the remote computer or server. In the latter scenario, the remote computer may be connected to the user's computer through any type of network, or the connection may be made to an external computer (for example, through the Internet using an Internet Service Provider) or in a cloud computing environment or offered as a service such as a Software as a Service (SaaS).

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the detailed description of the present subject matter, numerous specific details are set forth in order to provide a thorough understanding of the present subject matter. However, it will be clear to those of ordinary skill in the art that the present subject matter may be practiced without such specific details.

Although the subject matter has been described in language specific to structural features and/or methodological steps, it is to be understood that the subject matter defined in the appended claims is not necessarily limited to the specific features or steps (acts) described above. Rather, the specific features and steps described above are disclosed as example forms of implementing the claims.

What is claimed is:

1. A device for communicating with a plurality of user equipment in a cellular network, comprising:
    a non-transitory memory storing instructions; and
    one or more processors in communication with the non-transitory memory, wherein the one or more processors execute the instructions to:
        receive information regarding a faked base station including an operating frequency, location area code and a cell identification of the faked base station,
        prepare a first message to alert of the faked base station,
        select the plurality of user equipment that may receive a signal from the faked base station;
        transmit the first message to alert of the faked base station to the plurality of user equipment;
        transmit a second message including the operating frequency, location area code and the cell identification of the faked base station to the plurality of user equipment to bar the plurality of user equipment from connecting to the faked base station;
        transmit a third message to the plurality of user equipment to measure operating frequency and signal strength of the faked base station; and receive a fourth message from a first user equipment in the plurality of user equipment that indicates a measured operating frequency and signal strength of the faked base station.

2. The device of claim 1, wherein the second message includes a location area code.

3. The device of claim 1, further comprising the one or more processors executing the instructions to:
transmit a text message to alert users of the plurality of user equipment of acting on suspicious text messages.

4. The device of claim 1, further comprising the one or more processors executing the instructions to:
transmit a text message to alert users of suspicious symptoms of communication being interrupted.

5. The device of claim 4, wherein suspicious symptoms of communication being interrupted includes at least one of: downgraded encryption, no calling/called ID, suspicious location area code or suspicious cell ID.

6. The device of claim 1, wherein the device includes a transceiver to transmit and receive messages in a form of radio frequency signals to and from the plurality of user equipment and wherein the plurality of user equipment includes a first user equipment that includes a transceiver to transmit and receive radio frequency signals.

7. A computer-implemented method for responding to a faked base station, comprising:
receiving, with one or more processors, an indication of the faked base station;
selecting, with the one or more processors, a plurality of user equipment in a cellular network to notify regarding the faked base station;
preparing, with the one or more processors, a first text message to send to the plurality of user equipment regarding the faked base station;
preparing, with the one or more processors, a non-text message to send to the plurality of user equipment that bar the plurality of user equipment from connecting with the faked base station;
preparing, with the one or more processors, another non-text message to send to the plurality of user equipment to measure a radio frequency signal from the faked base station;
transmitting, with the one or more processors, the first text message to the plurality of user equipment;
transmitting, with the one or more processors, the non-text message to the plurality of user equipment so that the plurality of user equipment do not connect to the faked base station; and
transmitting, with the one or more processors, the another non-text message to the plurality of user equipment so that the plurality of user equipment measure the radio frequency signal from the faked base station.

8. The computer-implemented method of claim 7, wherein the non-text message includes an operating frequency, location area code of the faked base station and a cell identification of the faked base station.

9. The computer-implemented method of claim 8, further comprising:
transmitting, with the one or more processors, a second text message to alert users of the plurality of user equipment of acting on suspicious text messages.

10. The computer-implemented method of claim 9, further comprising:
transmitting, with the one or more processors, a third text message to alert users of suspicious symptoms of communication being interrupted.

11. The computer-implemented method of claim 10, wherein suspicious symptoms of communication being interrupted includes at least one of: downgraded encryption, no calling/called ID, suspicious location area code or suspicious cell ID.

12. The computer-implemented method of claim 10, wherein information of the first, second and third text messages are included in a single text message.

13. The computer-implemented method of claim 7, wherein the computer-implemented method is performed by a cellular network that includes a transceiver to transmit and receive messages in a form of radio frequency signals to and from the plurality of user equipment and wherein the plurality of user equipment includes a first user equipment that includes a transceiver to transmit and receive radio frequency signals.

14. The computer-implemented method of claim 7, further comprising:
receiving, with the one or more processors, measurement values of the radio frequency signal from at least one user equipment in the plurality of user equipment.

15. A non-transitory computer-readable medium storing computer instructions, that when executed by one or more processors, cause one or more processors to:
receive an indication of a faked base station that includes an operating frequency, location area code and a cell identification of the faked base station;
select a plurality of user equipment in a cellular network to notify regarding the faked base station;
prepare a first text message to send to the plurality of user equipment regarding the faked base station;
prepare a first non-text message to send to the plurality of user equipment that bar the plurality of user equipment from connecting with the faked base station, the first non-text message includes the operating frequency, location area code and the cell identification of the faked base station;
prepare a second non-text message to send to the plurality of user equipment to measure a radio frequency signal from the faked base station;
transmit the first text message to the plurality of user equipment;
transmit the first non-text message to the plurality of user equipment so that the plurality of user equipment do not connect to the faked base station; and
transmit the second non-text message to the plurality of user equipment so that the plurality of user equipment measure the radio frequency signal from the faked base station.

16. The non-transitory computer-readable medium of claim 15, further comprising computer instructions causing one or more processors to:
receive measurement values of the radio frequency signal from at least one user equipment in the plurality of user equipment.

17. The non-transitory computer-readable medium of claim 16, wherein measurement values include at least one of: location area code, cell identification, operating frequency, signal strength or other radio frequency signal characteristics of the radio frequency signal from the faked base station.

18. The non-transitory computer-readable medium of claim 15, wherein the first text message includes information regarding at least one of: alert of the faked base station, alert of acting on suspicious text messages or alert on suspicious symptoms of communication being interrupted.

19. The non-transitory computer-readable medium of claim 18, wherein suspicious symptoms of communication being interrupted includes at least one of: downgraded encryption, no calling/called identification, suspicious location area code or suspicious cell ID.

* * * * *